(12) United States Patent
Kirjavainen

(10) Patent No.: US 7,407,132 B2
(45) Date of Patent: Aug. 5, 2008

(54) METHOD OF STEERING AIRCRAFT BY MOVING THE STAGNATION POINT AND AIRCRAFT USING THE METHOD

(75) Inventor: Kari Kirjavainen, Tampere (FI)

(73) Assignee: Lightway, Tampere (FI)

( * ) Notice: Subject to any disclaimer, the term of this patent is extended or adjusted under 35 U.S.C. 154(b) by 385 days.

(21) Appl. No.: 10/565,173

(22) PCT Filed: Jul. 1, 2004

(86) PCT No.: PCT/FI2004/000416

§ 371 (c)(1),
(2), (4) Date: Jan. 19, 2006

(87) PCT Pub. No.: WO2005/007508

PCT Pub. Date: Jan. 27, 2005

(65) Prior Publication Data

US 2006/0175467 A1 Aug. 10, 2006

(30) Foreign Application Priority Data

Jul. 22, 2003 (FI) .................................. 20031095

(51) Int. Cl.
*B64C 29/00* (2006.01)
(52) U.S. Cl. ..................... 244/23 R; 244/23 C; 244/36; 244/73 R; 180/117
(58) Field of Classification Search ............... 244/23 R, 244/23 C, 4 A, 36, 50, 73 R; 180/117, 120
See application file for complete search history.

(56) References Cited

U.S. PATENT DOCUMENTS

| | | | |
|---|---|---|---|
| 3,410,507 A | 11/1968 | Moller | |
| 3,489,374 A | 1/1970 | Morcom | |
| 5,046,685 A | 9/1991 | Bose | |
| 5,064,143 A | 11/1991 | Bucher | |
| 5,170,963 A * | 12/1992 | Beck, Jr. | 244/12.2 |
| 5,203,521 A * | 4/1993 | Day | 244/12.2 |
| 5,881,970 A * | 3/1999 | Whitesides | 244/23 C |
| 6,073,881 A * | 6/2000 | Chen | 244/23 C |
| 6,375,117 B1 * | 4/2002 | Cain | 244/23 R |
| 6,464,166 B1 | 10/2002 | Yoeli | |
| 6,572,053 B2 * | 6/2003 | Salas | 244/12.2 |
| 6,648,270 B1 * | 11/2003 | Burnett et al. | 244/23 A |
| 6,666,403 B1 * | 12/2003 | Follensbee | 244/12.2 |

FOREIGN PATENT DOCUMENTS

| | | |
|---|---|---|
| DE | 1 288 924 | 2/1969 |
| EP | 0 327 371 | 8/1989 |
| EP | 0 534 611 | 3/1993 |
| FR | 2 630 697 | 11/1989 |
| WO | WO 86/04874 | 8/1986 |
| WO | WO 88/06119 | 8/1988 |
| WO | WO 0 194 199 | 12/2001 |

* cited by examiner

*Primary Examiner*—John W Eldred
(74) *Attorney, Agent, or Firm*—Young & Thompson

(57) ABSTRACT

An aircraft which includes elements providing air circulation and directing the circulation along a housing. Different operational stages of the aircraft such as take off and level flight are achieved by using the same functionally inter-connected elements. The circulation is achieved by fan elements that allow adjusting the blow direction and the blowing force of the flow. A stagnation point (SP) associated with the circulation is also formed if necessary below the housing and the aircraft can be steered by controlling the circulation and the position of the stagnation point (SP).

25 Claims, 12 Drawing Sheets

METHOD OF STEERING AIRCRAFT BY MOVING THE STAGNATION POINT AND AIRCRAFT USING THE METHOD

BACKGROUND OF THE INVENTION

The invention relates to a method of steering an aircraft comprising a housing and fan means.

The invention also relates to an aircraft comprising a housing and fan means.

BRIEF DESCRIPTION OF THE INVENTION

Publication WO 01/94 199 discloses an aircraft provided with a housing that is circular in shape as viewed from above. Rotatable rings comprising vanes provided with adjustable blade angles are arranged about the housing. Rotating the rings and adjusting the blade angles appropriately allow the aircraft to lift in the vertical direction. After take-off during level flight the vanes in the rings are turned in the horizontal direction and the jet engines at the sides of the housing generate forward thrust during level flight. Separate means are therefore used during take-off and level flight, whereby the aircraft has to employ various mechanisms. Consequently the aircraft becomes complex and therefore difficult and expensive to implement. Furthermore, the steering of the aircraft at different operational stages becomes extremely complicated and difficult.

Publication WO 86/04 874 also shows an aircraft that is circular in shape viewed from above. The aircraft in question comprises engines at the upper surface thereof that provide a flow above the surface of the aircraft. The flow tends to provide lift on the upper surface. It is extremely difficult to make such an aircraft operate reliably enough and so that it provides adequate lift. In addition, steering such an aircraft is very complicated and difficult.

U.S. Pat. No. 3,785,592 discloses an aircraft comprising a propeller at the highest level. The propeller is used to direct air downwards along a channel. The channel bends towards the side. During level flight the aircraft should be steered by closing flaps on the annular output of the channel at desired positions. The structure of such an aircraft is very complex and difficult to implement and also difficult to steer.

Publication EP 0 534 611 shows an aircraft comprising in the middle of the aircraft an inlet opening upwards, from which air is sucked by a rotor inside the housing. The rotor discharges the air through a circular opening on the outer circumference of the aircraft. The blade directing the flow is arranged on the outer circumference. The structure of this aircraft is also very complex and the steering thereof is complicated and difficult.

It is an object of the present Invention to provide a new type of method of steering an aircraft, and an aircraft.

The method according to the invention is characterized by forming circulation using the fan means and directing the circulation along the housing and by steering the aircraft by controlling the circulation and a stagnation point associated with the circulation.

The aircraft according to the invention is characterized in that the fan means are such that they provide adjusting the blow direction and blowing force of the air flow such that air circulation is achieved and said circulation is directed along the housing and that the fan means are arranged to direct the circulation and to control the position of a stagnation point associated with the circulation.

It is an essential idea of the invention to achieve the different operating states of the invention such as take-off and level flight using the same operationally inter-connected means. The aircraft comprises means, by which the circulation of air is achieved and said circulation is directed along the housing. The circulation is achieved by fan means that enable to adjust the blow direction and blowing force of the flow. A stagnation point associated with the circulation can also be formed if required below the housing and the aircraft can be steered by controlling the circulation and the position of the stagnation point. The aircraft provides such advantages that the structure thereof is maintained reasonably simple and despite thereof the movements and operational states of the aircraft remain versatile. In addition the efficiency of the aircraft becomes extremely good and the effective space within the housing of the aircraft becomes large.

BRIEF DESCRIPTION OF THE DRAWINGS

The invention will be described in greater detail in the accompanying drawings, in which FIG. 1 schematically shows a side view of an aircraft during takeoff.

DETAILED DESCRIPTION OF THE INVENTION

Figure 1:
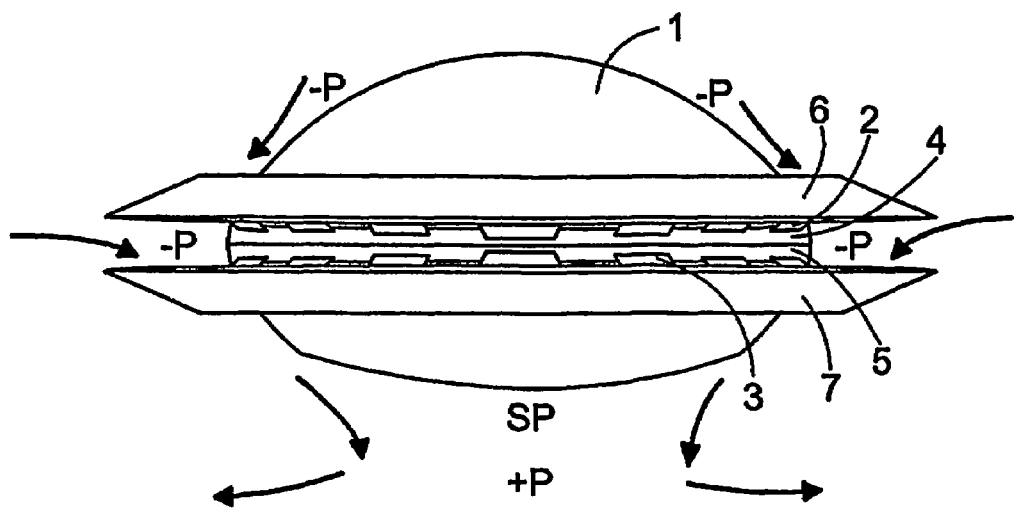

FIG. 1 shows an aircraft comprising a housing 1 that is more convex on the upper surface thereof than on the lower surface thereof. Upper fan blades 2 and lower fan blades 3 are arranged about the housing 1. The upper fan blades 2 are fastened to an upper rotating ring 4 and the lower fan blades 3 are fastened to a lower rotating ring 5. The rotating rings 4 and 5 enable to rotate the fan blades 2 and 3 about the housing 1. Preferably the fan blades 2 and 3 are rotated in opposite directions, whereby the operation of the aircraft becomes stable.

The aircraft also comprises an upper air spoiler 6 and a lower air spoiler 7. Rotating the fan blades 2 and 3 and adjusting the blade angles thereof enable the fan blades 2 and 3 to direct air between the housing 1 and the air spoilers 6 and 7. The air spoilers 6 and 7 are immovably fastened in relation to the housing 1.

When taking off with the aircraft, the blade angles of the fan blades 2 and 3 are arranged to be positive, whereby the upper fan blades 2 suck air between the housing 1 and the upper air spoiler 6 and blow the air downwards. The lower fan blades 3 moving in the opposite direction suck the air downwards and also air between the air spoilers and blow the total flow between the housing 1 and the lower air spoiler 7 below the housing. The low pressure $-P$ created on the upper surface of the housing 1, the lift of the fan blades 2 and 3 and the high pressure $+P$ created below the housing 1 provide efficient total lift.

As shown above the stagnation point, indicated by SP in the figure, is formed below the aircraft 1, in the middle thereof. The stagnation point is a point, where the flow rate in connection with the aircraft is minimal and the pressure is maximal and where a force is placed upon the surface, for example lift or thrust. When an aircraft is ready to leave the ground, pressure is created below the housing, and through this lift, which is transversely proportional to the square of the distance. Consequently, the aircraft easily lifts slightly from the ground and reaches what is known as the float height.

Figure 2:
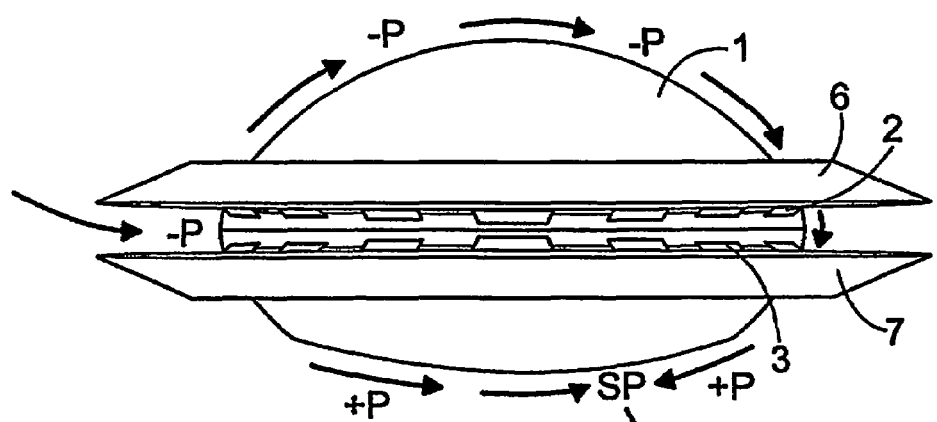
FIG. 2 shows the aircraft of FIG. 1 during slow level flight.

The aircraft may take off utilizing the float. Thus, the aircraft is at first steered to float, in which case the aircraft remains close to the ground, but for instance by changing the centre of gravity or by directing the blade angles, the position of the stagnation point SP is diverted for example as shown in FIG. 2 below the rear end of the housing 1, whereby the horizontal movement starts. Then the aircraft moves to the left as viewed in FIG. 2. After this, the blade angle of the upper fan blades 2 is arranged in the negative direction, whereby air starts to flow in accordance with FIG. 2 also between the upper air spoiler 6 and the front end of the housing 1 above the housing. A low pressure $-P$ is created between the fan blades 2 and 3 in the front end of the aircraft and the aircraft starts to move forward more rapidly. The housing 1 also starts to provide lift.

Figure 3:
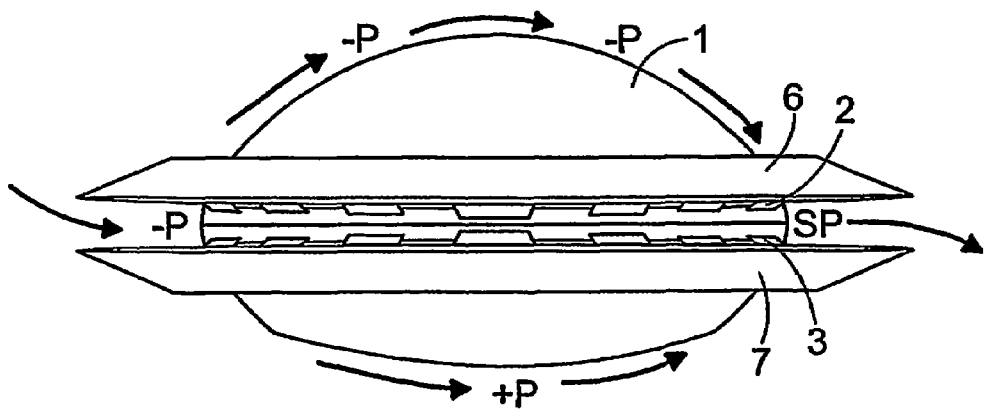
FIG. 3 shows the aircraft of FIG. 1 during fast level flight.

While the speed increases also the blade angles of the lower fan blades 3 are arranged in a negative direction at the rear end of the aircraft, whereby an overpressure is created at the rear end of the aircraft providing more thrust and speed. Thus, the stagnation point SP is arranged at the rear end of the aircraft between the fan blades 2 and 3, i.e. at the tail of the housing 1, as shown in FIG. 3. The fan blades 2 and 3 also suck air from the rear end of the housing, thus preventing the flow from loosening from the surface of the rear end of the housing 1. The stagnation point SP has thus been diverted from the front of the aircraft to the rear thereof. The same can be implemented sideways, whereby the aircraft provides thrust in the sideward direction. Turning the operation in the opposite direction, it also becomes possible to brake.

Power can be saved during take-off so that the rotating rings 4 and 5 as well as the fan blades 2 and 3 accelerate at first to an adequate speed while the blade angles remain at zero. After this, the blade angles are arranged to be positive, whereby take-off takes place by means of the motion energy stored in the rotating rings.

If the power of the engine is adequate, the aircraft may lift vertically upwards without any float. The transfer to horizontal flight takes place similarly after all the take-off ways, in other words by arranging at first the blade angle of the upper fan blades in the negative direction, as shown above.

Figure 4:
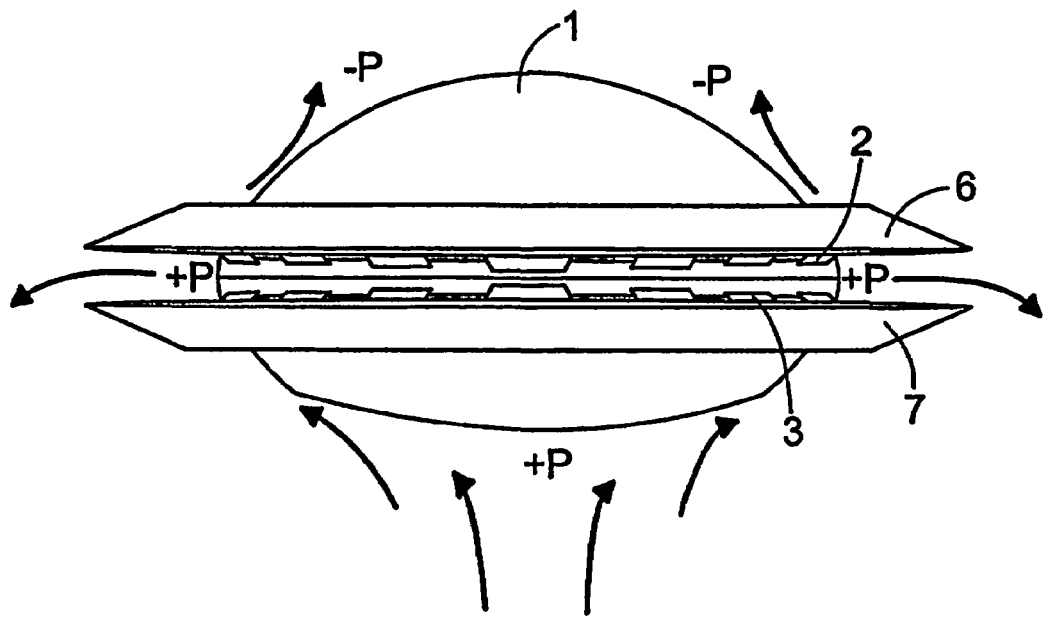
FIG. 4 shows the aircraft of FIG. 1 during landing.

Landing in all operational states may take place in reverse order in respect of the one presented above. Landing may also take place in the parachute state shown in FIG. 4. Air is then allowed to flow from beneath the aircraft as indicated by the arrows in FIG. 4. The fan blades 2 and 3 may rotate freely, thus stabilizing the landing or the fan blades 2 and 3 may be rotated in order to achieve the desired steering. In FIG. 4, the aircraft finds its way to equilibrium itself.

Figure 5:
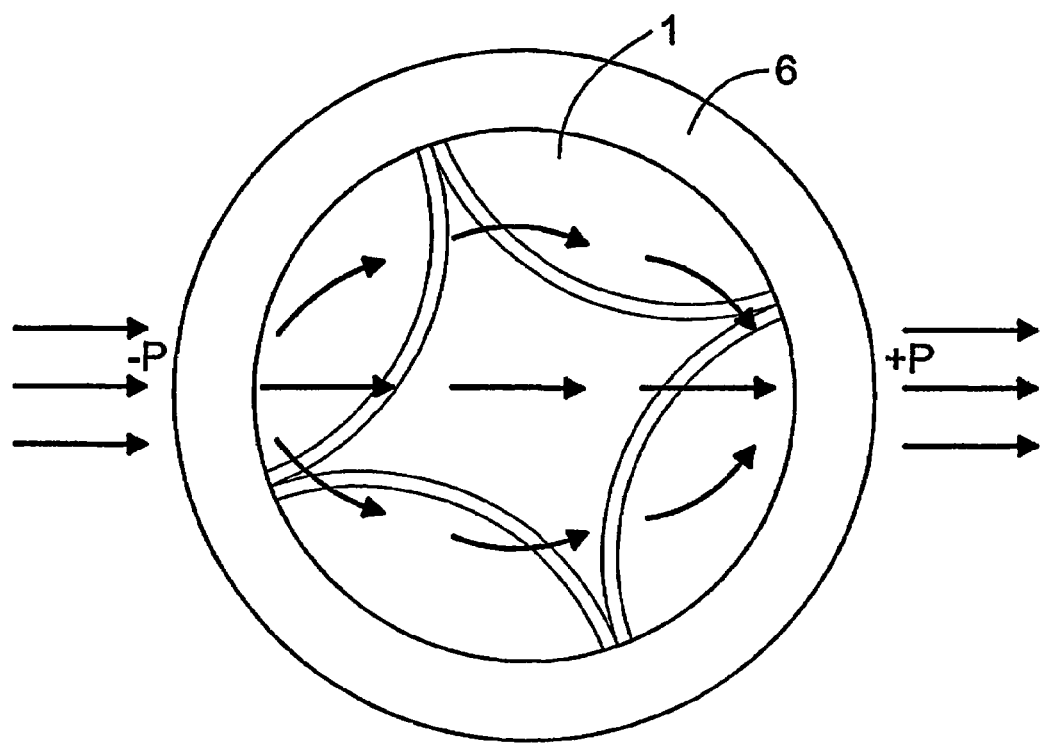
FIG. 5 shows a top view of the aircraft of FIG. 1 during fast level flight, FIG. 6 schematically shows a top view of a second aircraft.

FIG. 5 shows a top view of the aircraft. The housing 1 of the aircraft is of circular shape when viewed from above. FIG. 5 illustrates how air flows above such a convex housing 1 during fast level flight.

Figure 6:
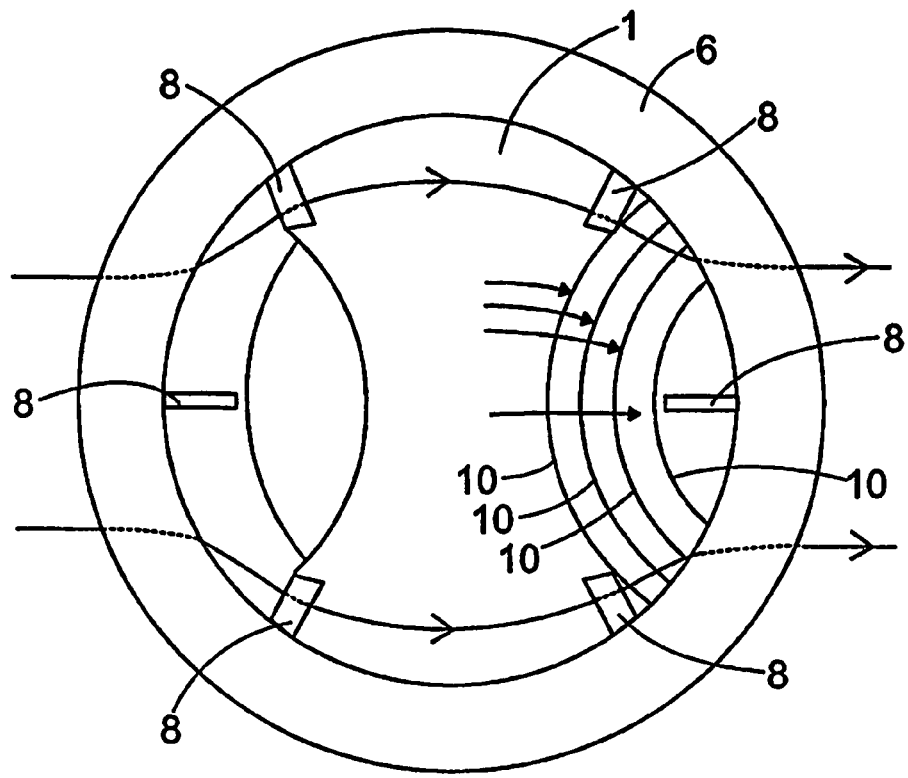
Figure 7:
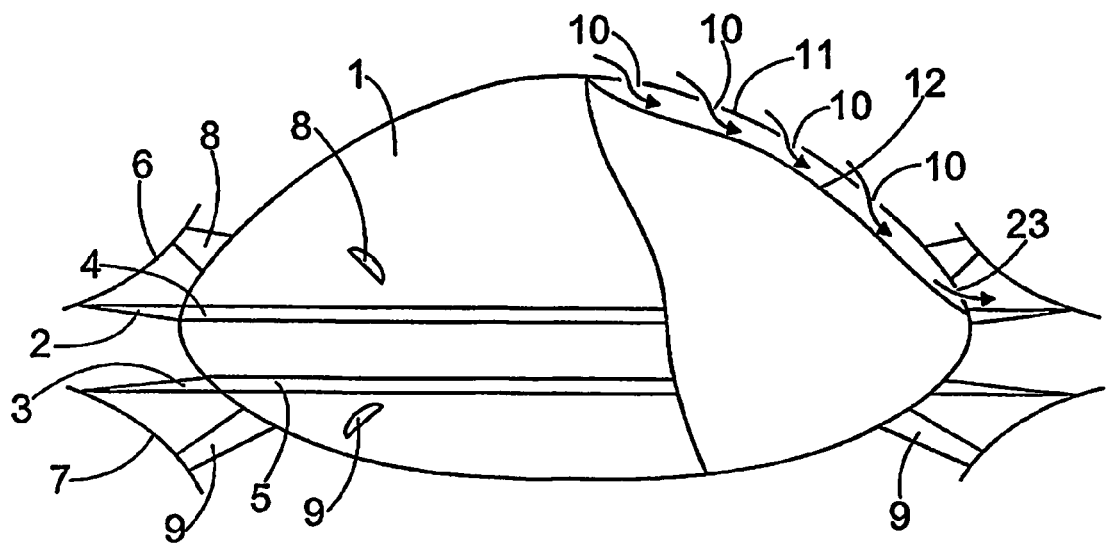
FIG. 7 shows a partly open cut side view of the aircraft of FIG. 6, FIG. 8 schematically shows a side view of a third aircraft, FIG. 9 schematically shows a side view of a fourth aircraft, FIG. 10 schematically shows a side view of a fifth aircraft, FIG. 11 schematically shows a top view of fan blades, FIG. 12 schematically shows a side view of a sixth aircraft, FIG. 13 schematically shows a side view of a seventh aircraft, FIG. 14 schematically shows a front view of the aircraft of FIG. 13, FIG. 15 schematically shows a side view of an eighth aircraft, FIG. 16 schematically shows a side view of a ninth aircraft, FIG. 17 schematically shows a side view of a tenth aircraft, FIG. 18 schematically shows a side view of a eleventh aircraft, FIG. 19 schematically shows a top view of the aircraft of FIG. 18, FIG. 20 schematically shows a side view of a twelfth aircraft, FIG. 21 schematically shows a top view of the aircraft of FIG. 20, FIG. 22 schematically shows a side view in cross section of a thirteenth aircraft during take-off, FIG. 23 schematically shows a side view in cross section of the aircraft of FIG. 22 during slow level flight, FIG. 24 schematically shows a side view in cross section of the aircraft of FIG. 22 during fast level flight, FIG. 25 schematically shows a top view of the aircraft of FIG. 22.

What can also be utilized when steering the aircraft is upper guide vanes 8 and lower guide vanes 9 arranged between the housing 1 and the air spoilers 6 and 7 as shown in FIGS. 6 and 7. The guide vanes 8 and 9 are rotatable about the axis thereof. When steering an aircraft, the adjustment of the blade angles of the fan blades 2 and 3 can be utilized as the function of the rotating angle as well as the guide vanes 8 and 9, or if desired only one of the two.

A solution is also shown In FIGS. 6 and 7, In which the upper surface of the rear end of the aircraft is provided with suction slots 10. From the suction slots 10 the air flow is transferred to a space between the outer casing 11 and intermediate casing 12 of the housing, from which the fan blades 2 suck air through a suction gap 23. Then the air flow is well maintained at the rear surface of the aircraft, in other words the air flow is not loosened from the rear surface of the aircraft.

FIG. 7 also clearly shows that the shape of the air spoilers 6 and 7 is formed to follow the streamline form of the air flow. Then the air spoiler itself causes only a minimal amount of force that resists the flow. If desired, the air spoilers 6 and 7 can be arranged at least in the front end of the aircraft to be at a positive angle of attack in relation to the streamlines, whereby the air spoilers 6 and 7 provide lift during level flight. The support structures used to fasten the air spoilers 6 and 7 to the housing 1 are also most preferably in line with the streamlines, if the support structures concerned are flat.

Figure 8:
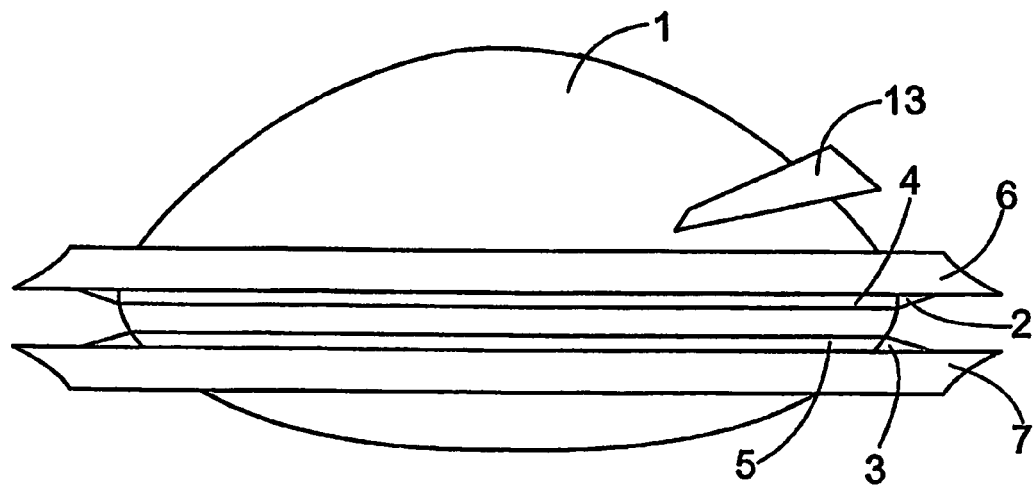

FIG. 8 in turn shows an embodiment, in which the rear end of the aircraft is provided with an additional air spoiler 13 that allows maintaining also the air flow on the rear surface of the upper portion of the aircraft.

Figure 9:
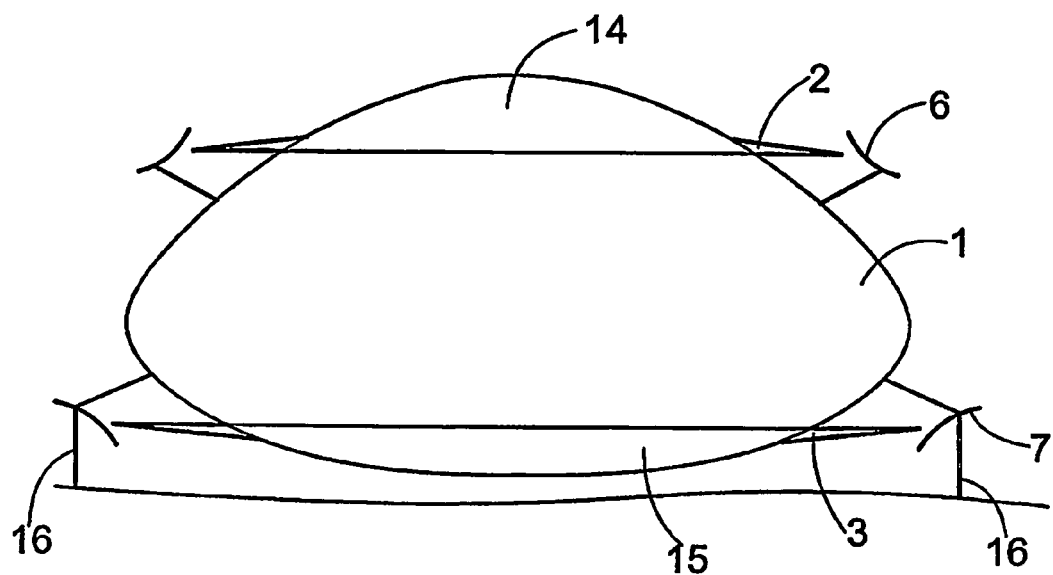

FIG. 9 shows an application, in which the centres of the fan blades 2 and 3 form the upper and lower surface of the housing and rotate about the centre axis thereof. Thus, an upper calotte 14 and a lower calotte 15 of the housing are rotatable. Landing feet 16 are fastened to the lower air spoiler 7.

The upper fan blades 2 may operate during take-off also as centrifugal fans, if the blade angle thereof is arranged to be large. Consequently, rotation is created in the air flow and a low pressure affects the upper surface of the housing. Thus the centrifugal force allows the air flow to be directed upwards, and the flow does not settle against the housing, but a conical flow outwards is achieved.

The lower surface of the lower calotte 15 can also be provided with hydrofoils that lift the bottom of the aircraft above water level, whereafter the pressure provided by the fan blades 2 and 3 reaches the bottom and lifts the aircraft from water level.

Figure 10:
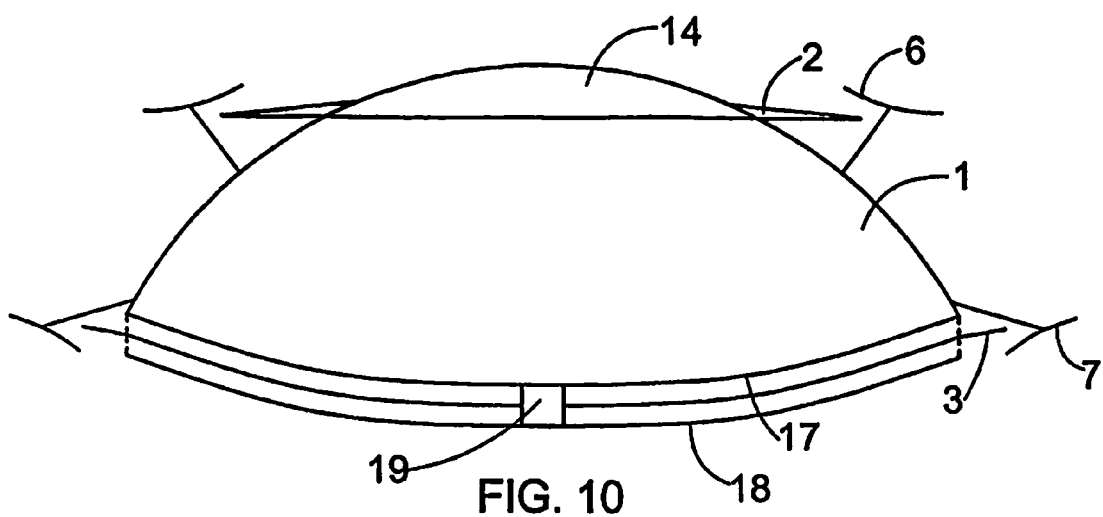

FIG. 10 shows an embodiment, In which the centre of the lower fan blades 3 rotates about an axis 19 between an inner bottom 17 and an outer bottom 18. Also in this embodiment, hydrofoils can be arranged below the outer bottom 18. The aircraft may rise on the hydrofoils for instance by providing thrust with the fan blades 2 and 3.

Figure 11:
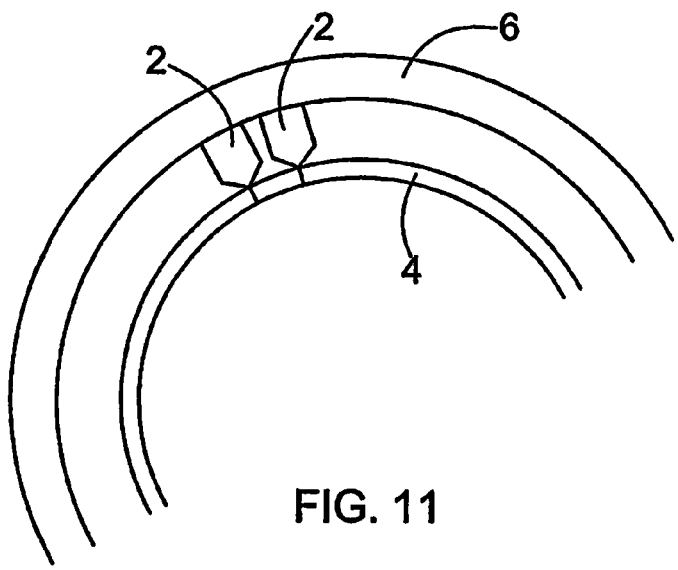

FIG. 11 schematically illustrates a solution, in which the fan blades 2 are fastened from the root thereof to the rotating ring 4. Both the root and the tip of the air blades 2 are narrower than the middle part thereof, whereby the blade angles of said air blades are adjustable both in the positive and negative direction. In order to provide an even flow, the number of fan blades 2 and 3 should be significant. The number of fan blades 2 and 3 on the rim may range for instance from 24 to 48, but for the sake of simplicity only two of the fan blades 2 are shown in FIG. 11. Since the ground effect substantially reduces the need for power, the fan blades may be very short. The length of the fan blade 2 and 3 may for instance be 1/10 of the diameter of the housing 1. For example, the diameter of the housing 1 may be 5 m, the height of the housing 1 approximately 2 m and thus the length of the fan blades is approximately 50 cm.

When the number of fan blades is significant, the upper rotor causes the air in the rotating direction to rotate. Such a rotation can best be stopped with a lower blade rim rotating in the opposite direction, in which the fan blades are substantially parallel. Consequently, air can be transferred from an upper rotor through a lower one.

Figure 12:
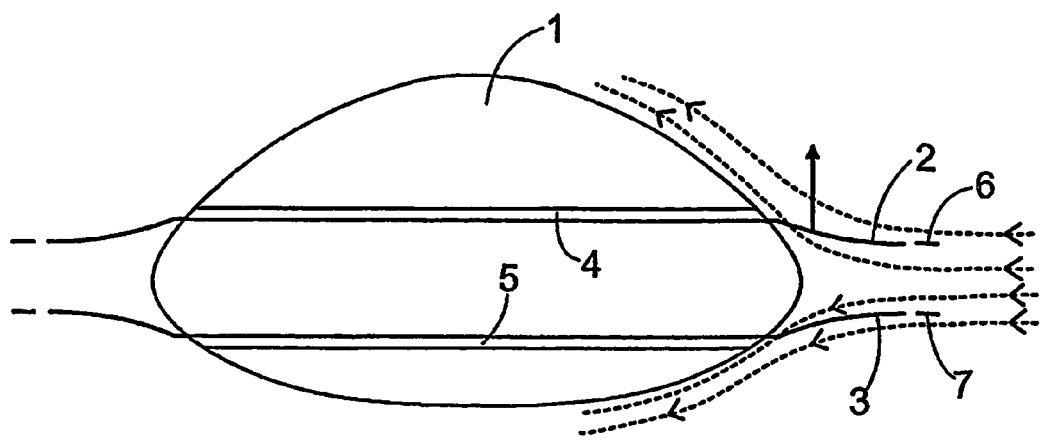

FIG. 12 shows an embodiment, in which the fan blades 2 and 3 are arranged in the form of streamlines. In FIG. 12, the root of the upper fan blades 2 is higher than the tip thereof and correspondingly the root of the lower fan blades 3 is lower than the tip thereof. The air spoilers 6 and 7 are rings fastened at the tips of the fan blades 2 and 3 so that the air spoilers 6 and 7 rotate with the fan blades 2 and 3.

When the fan blade is parallel with the streamline, then only a minor angle change of the blade is required to provide a flow component parallel with the streamline. Furthermore, in the solution shown in FIG. 12, the flow flowing near the surface of the housing 1 may flow between the fan blade and the housing past the mounting shaft of the blade, in which case the root of the blade does not cause flow resistance. Then the fan blades cause very little flow resistance, although the blade angle thereof were zero, meaning that gust of winds for instance from the side do not substantially cause stability problems. Furthermore, the flow can be controlled even when the speed of the rotating ring is low in relation to the airspeed, and a minor angle change of the fan blade suffices to control the flow.

Figure 13:
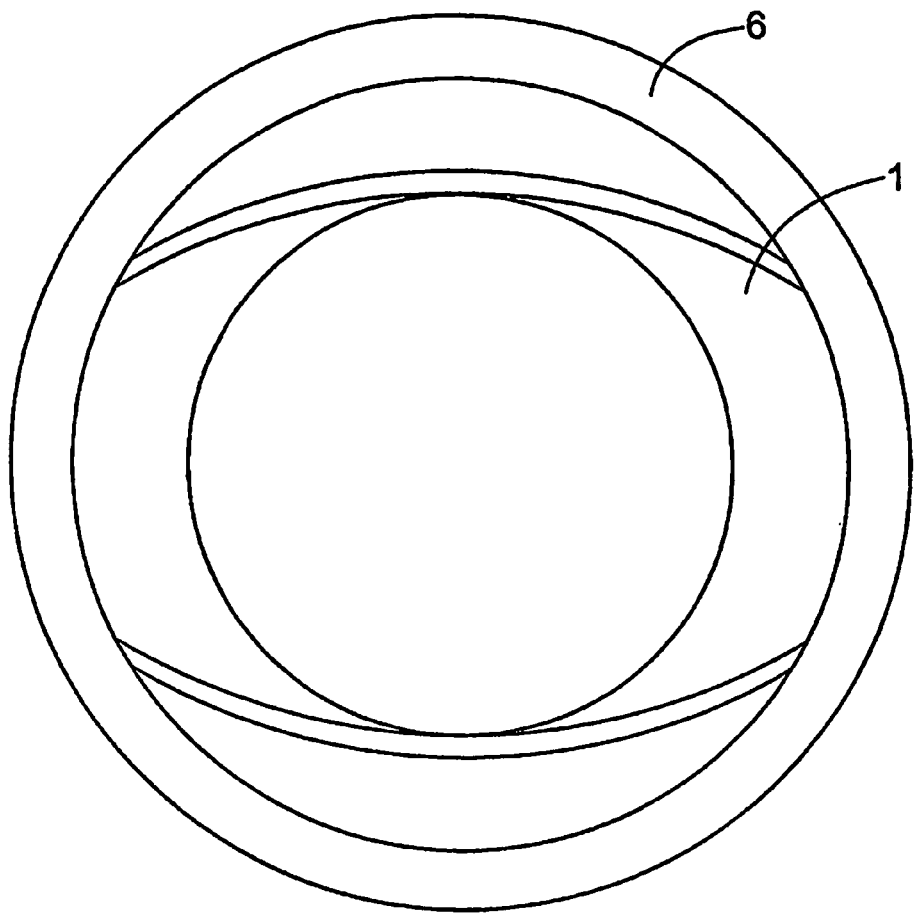
Figure 14:
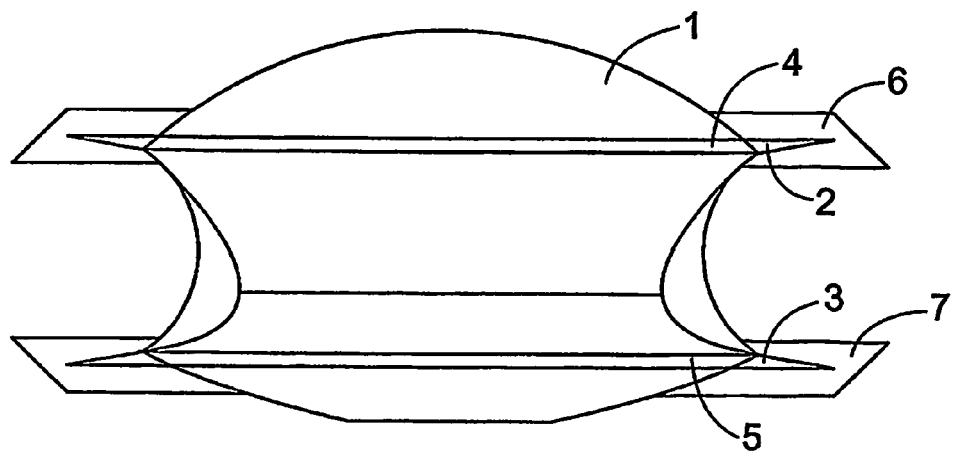

FIG. 13 shows a top view of an aircraft and FIG. 14 a front view of an aircraft, the housing 1 of which is not circular viewed from above, instead the housing 1 is elongated. In FIG. 14 the air spoilers 6 and 7 are shown cut open.

Figure 15:
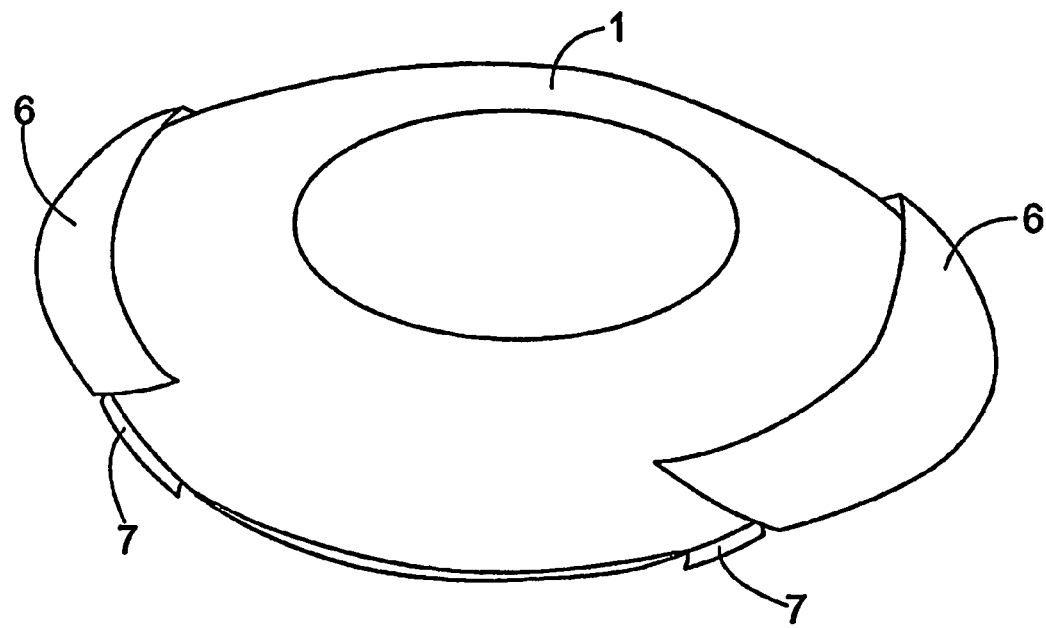

FIG. 15 shows an embodiment, in which the air spoilers 6 and 7 do not form a uniform ring, as in the previous embodiments. The embodiment shown in FIG. 15 is well suitable to be used for instance in solutions, where the means for providing circulation are not fan blades 2 and 3 but propeller fans arranged between the housing 1 and the deflectors 6 and 7 in the housing.

Figure 16:
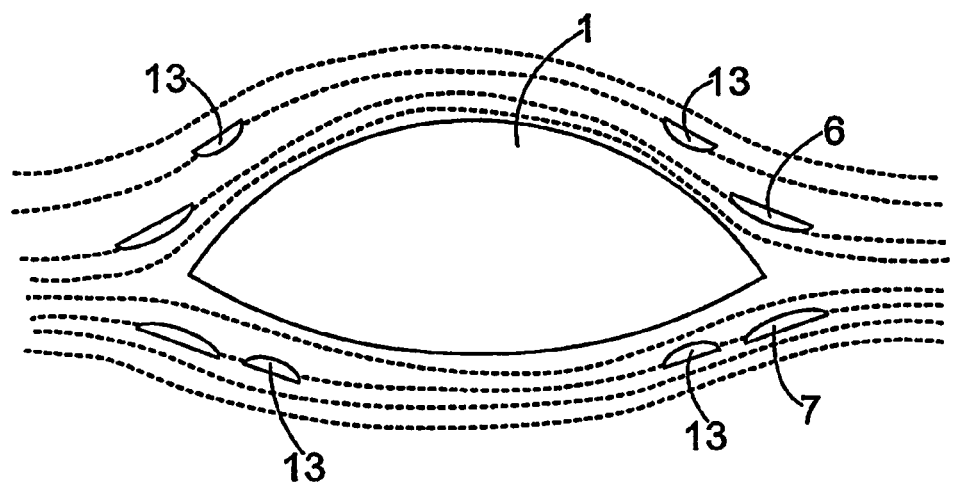

FIG. 16 schematically illustrates how the air spoilers 6 and 7 as well as the additional air spoilers 13 are arranged in parallel with the streamlines. The dashed lines in FIG. 16 illustrate specifically the streamlines of the flow. The shape of the housing 1 mainly determines the direction of the streamlines. The direction of the streamlines, or the streamline field, can be deformed by blades, fans and air spoilers.

Figure 17:
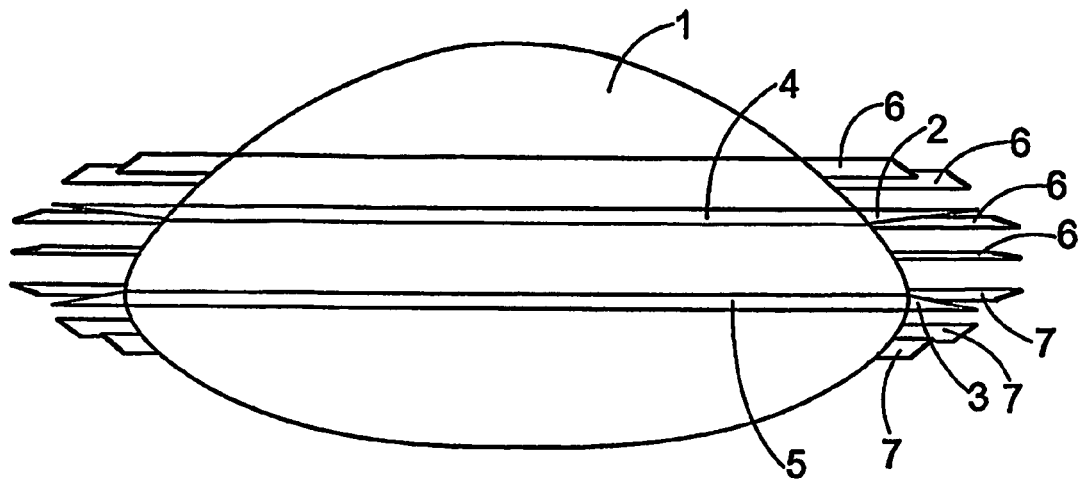

FIG. 17 shows an embodiment, which comprises several upper air spoilers 6 and lower air spoilers 7. In FIG. 17 the air spoilers 6 and 7 are shown cut open. The air spoilers 6 and 7 also operate as a protective net around the fan blades 2 and 3. Thus the fan blades 2 and 3 do not cause any danger to the surroundings and on the other hand the fan blades 2 and 3 are protected from being damaged by branches, birds or other similar external objects. The air spoilers 6 and 7 are annular in shape and they may also be very narrow. The air spoilers 6 and 7 are arranged in parallel with the streamlines or so that they are at a positive angle of attack in relation to the streamlines.

FIG. 17 further shows that the fan blades 2 and 3 are substantially horizontal. Then the centrifugal force is unable to bend the tips thereof, which is the case if the position of the blades is different than a horizontal one. In the situation shown in FIG. 17, no supportive ring or the like is required at the end of the blades.

Figure 18:
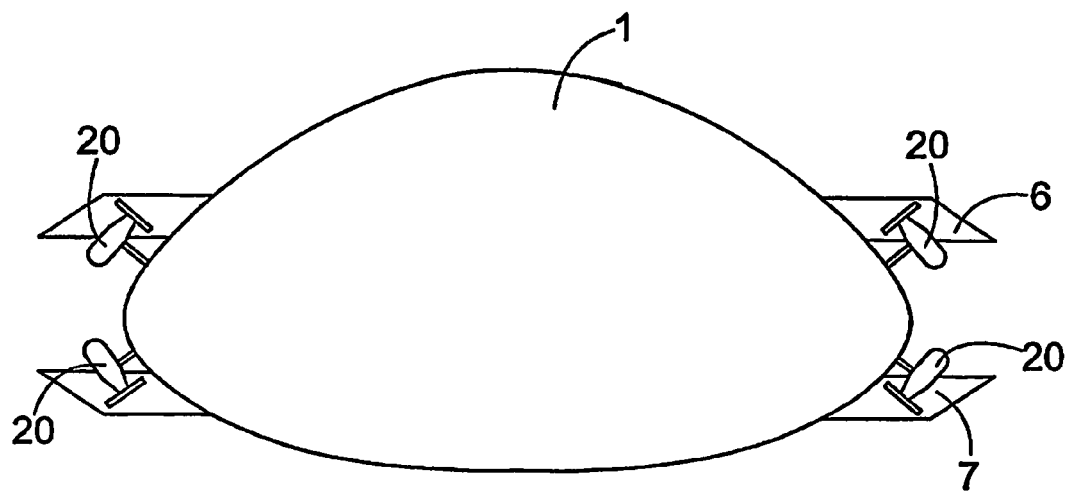
Figure 19:
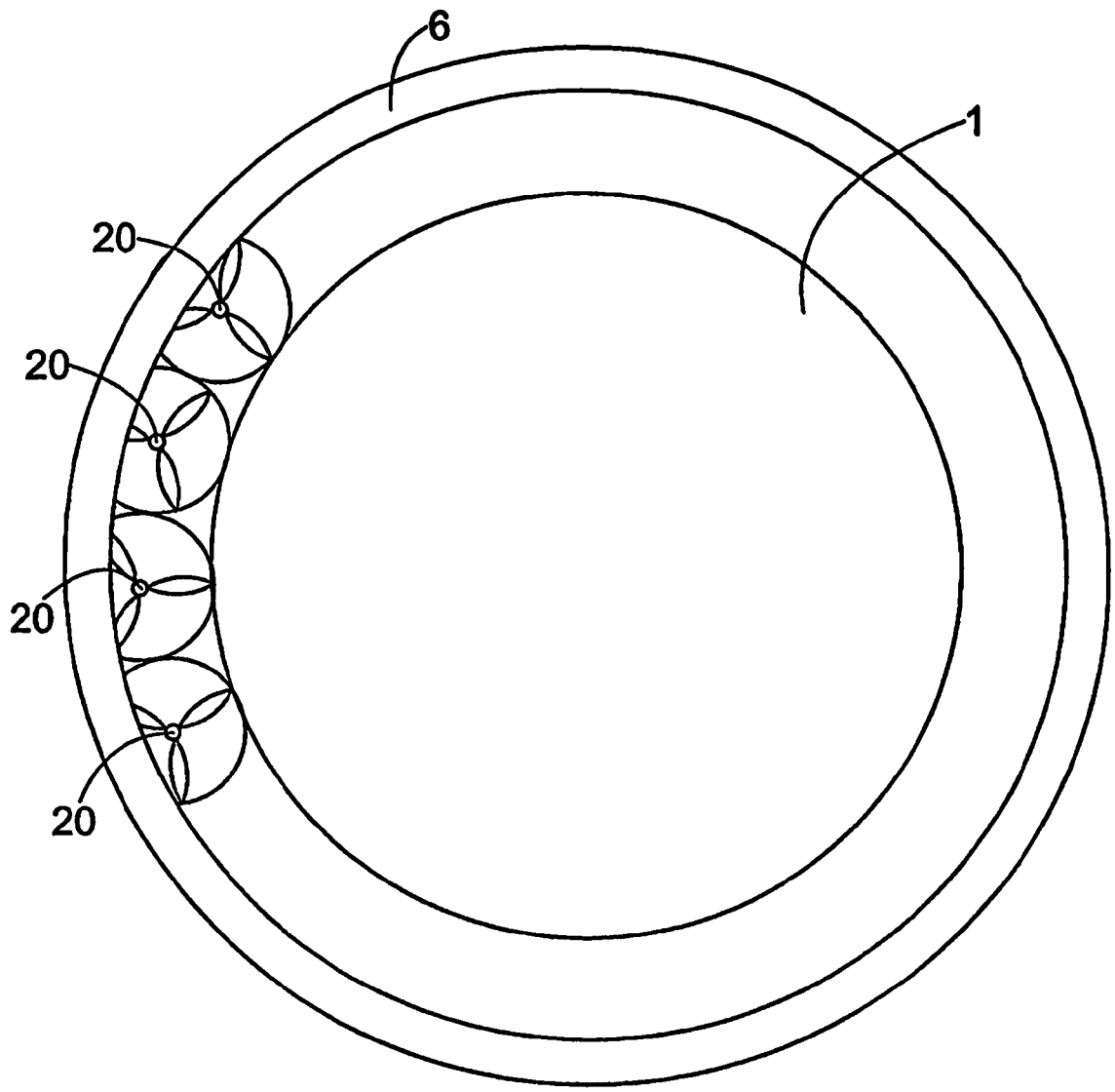

FIGS. 18 and 19 schematically shows a solution, in which the means for providing circulation are propeller fans 20. The propeller fans 20 are arranged about the housing 1 between the housing 1 and the air spoilers 6 and 7. In FIG. 18 the air spoilers 6 and 7 are shown cut open and for the sake of clarity FIG. 19 only shows some of the propeller fans 20.

Figure 20:
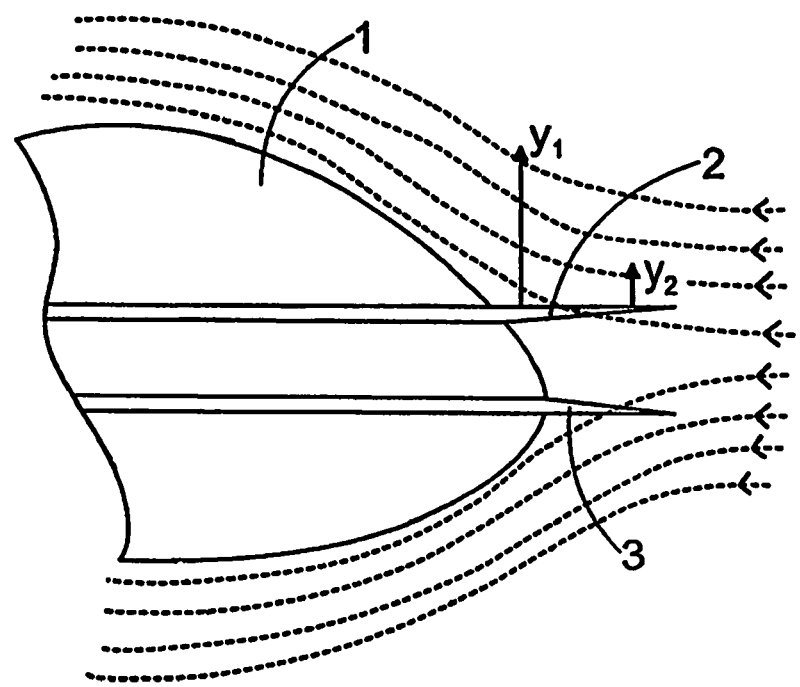
Figure 21:
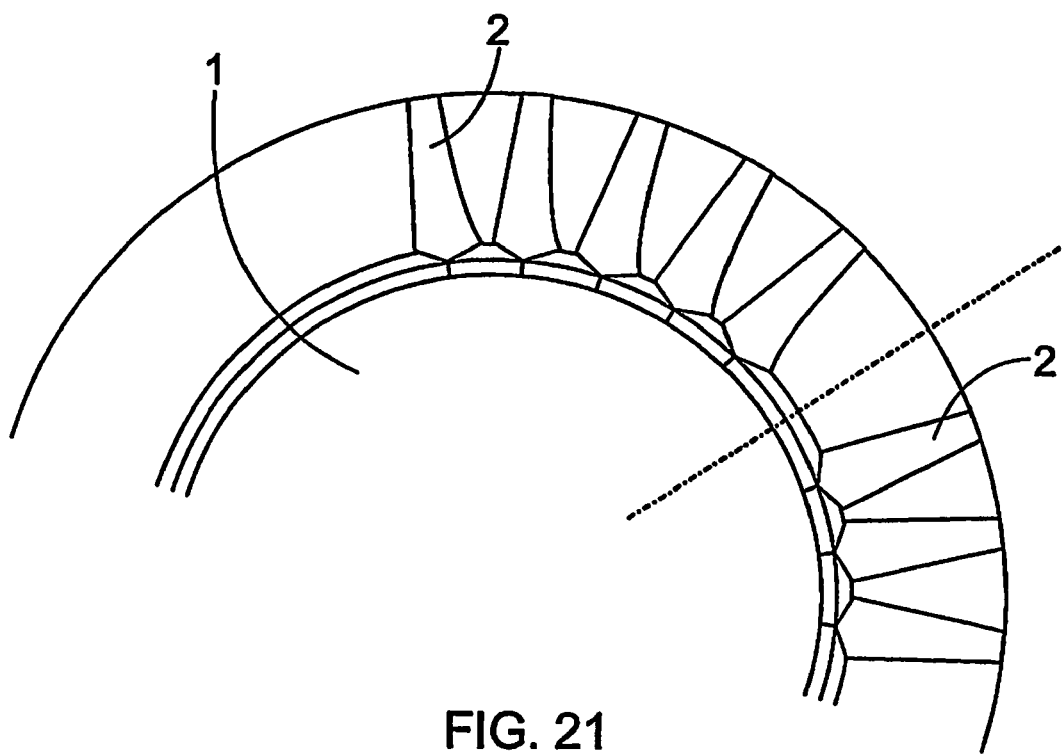

FIG. 20 illustrates a vertical component y of the streamlines. The vertical component $y_1$ of the streamline that is close to the housing 1 is larger than the vertical component $y_2$ of the streamline that is further from the housing. A basic idea is that the fan blades 2 and 3 affect especially the speed in direction y of the streamlines. The flow direction is deviated by means of the blade angle in particular. As FIG. 20 shows, the need for deviating the streamline in direction y at the root is greater than at the tip. The fan blades are therefore preferably broader at the roots than at the tips as shown in FIG. 21. In FIG. 21, the blades illustrated at the top are ideally shaped, but the symmetrical almost triangular blades illustrated lower down in the figure also provide a very good solution. Preferably the blades are straight so that the blade angle is equal at the root and at the tip, in which case the blade operates as desired when the blade angle is turned in the positive direction and when the blade angle is turned in the negative direction.

Figure 22:
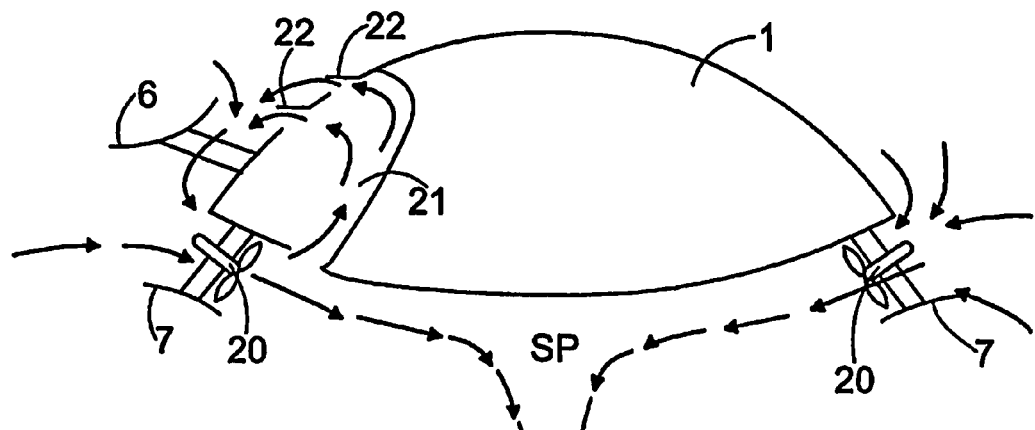

FIG. 22 shows an application, in which the front end of the housing 1 comprises a lower air spoiler 7 and propeller fans 20 below the housing. The rear end of the housing comprises an upper air spoiler 6 and a lower air spoiler 7 and propeller fans 20 below the housing.

The rear end of the housing also includes a return air space 21. The upper part of the return air space 21 comprises adjustable flaps 22.

The propeller fan 20 allows forming a stagnation point SP below the housing 1 of the aircraft, in the middle thereof. The adjustable flaps 22 are then arranged to allow return air to flow as shown in FIG. 22.

Figure 23:
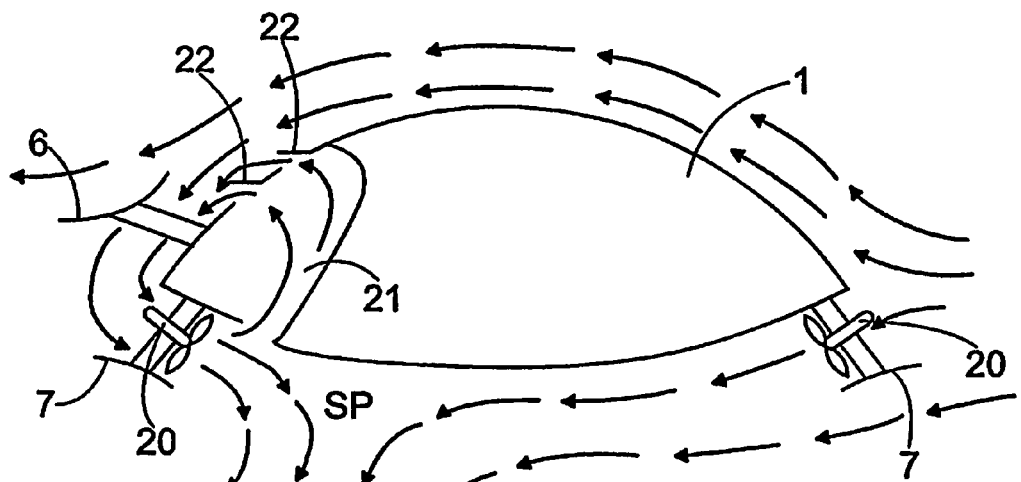

When diverting to slow level flight, the position of the stagnation point SP is moved for instance by changing the centre of gravity or by adjusting the rotation speed of the propeller fans 20. Thus, also at the rear end of the aircraft the propeller fans rotate in the same direction in FIG. 23 as in the situation shown in FIG. 22 and the adjustable flaps 22 are in the same position, whereby the flow through the return air space 21 is similar to the one shown in FIG. 22.

Figure 24:
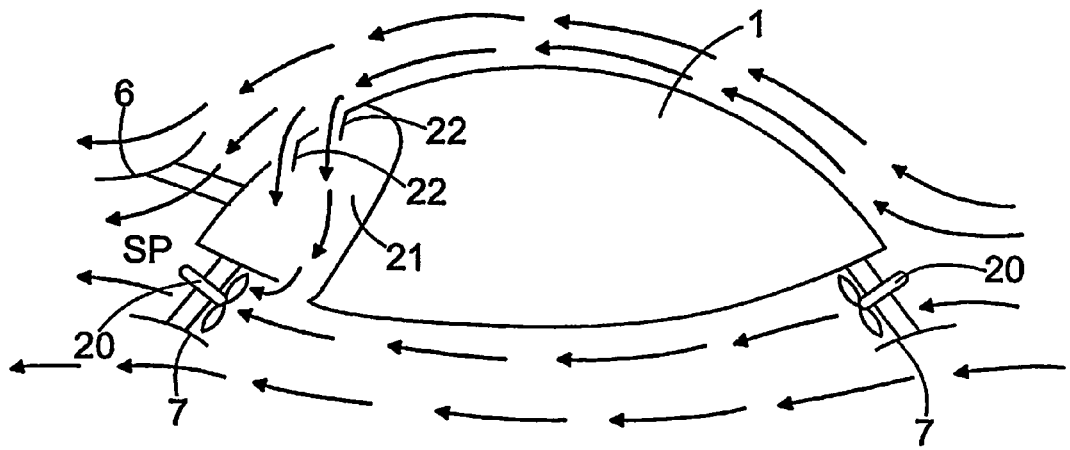

When diverting to fast level flight, the blow direction of the propeller fans 20 at the rear end of the housing 1 is changed to the opposite one, whereby air flows as shown in FIG. 24. The adjustable flaps 22 are then turned to direct the air flow through the return air space 21 so that air flowing from above the housing may flow through the return air space 21 as illustrated in FIG. 24. In all, the return air space 21 allows making the air flow optimally more efficient in all different operational stages and preventing the flow from loosening from the rear end of the housing.

The oxygen supply and the cooling in the return air space 21 are good. The return air space 21 is therefore a good space for example for fuel cells functioning as energy sources.

The air spoilers 6 and 7 are not necessary, but they are advantageous at least for protecting the propeller fans 20. The circulation can also be produced using what are known as channel fans provided with a protective ring around the propeller. Such a protective ring may also function as an air spoiler.

The propeller fans 20 can be controlled irrespective of one another. If desired the propeller fans can be arranged to rotate in opposite directions on the right and left side of the aircraft.

Figure 25:
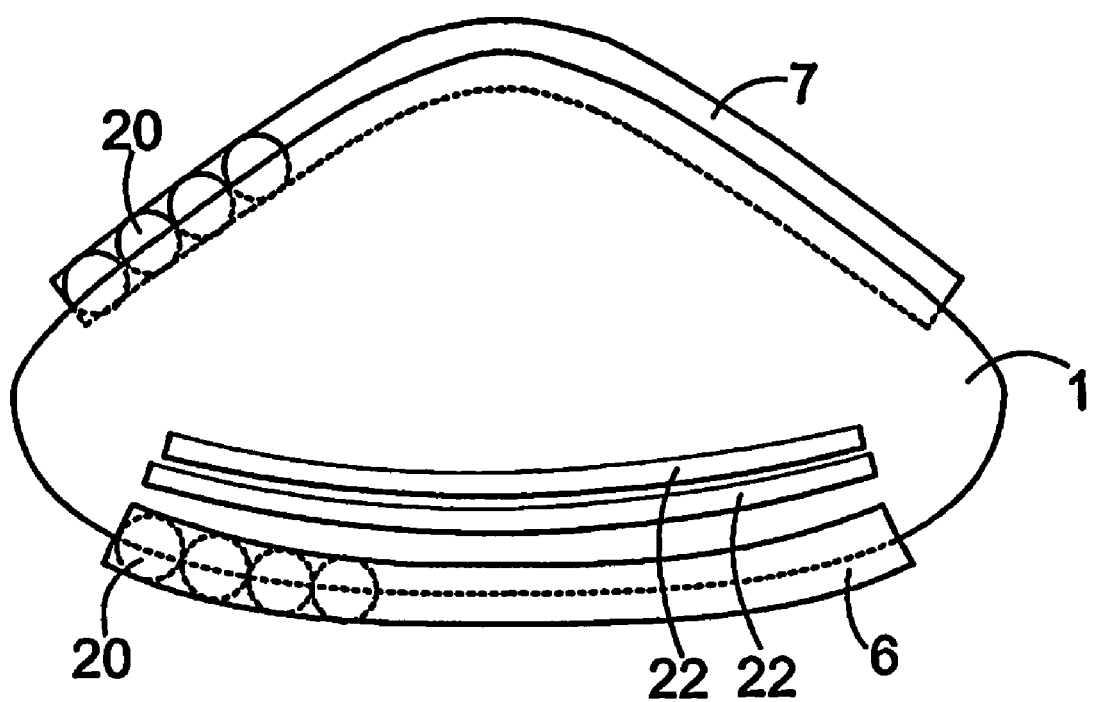

FIG. 25 shows a top view of the aircraft of FIG. 22. In FIG. 25, for the sake of clarity the dashed line illustrates also devices that remain invisible beneath the housing and the air spoiler. For clarity, only some of the propeller fans 20 are shown. As shown in FIG. 25 the housing of the aircraft 1 is not symmetrical as regards rotation. In FIG. 25, the main flight direction of the aircraft is upwards as shown in the figure. The housing 1 that is not symmetrical as regards rotation shown in FIG. 25 means that the aircraft remains extremely stable also without steering.

The drawings and the specification associated therewith are merely intended to illustrate the idea of the invention. As to the details, the invention may vary within the scope of the claims. What can therefore be used as fan means instead of fan blades and propeller fans to produce circulation is any device or equipment suitable for the purpose, if the device or equipment in question provides an air flow or a gas flow, whose blow direction and blowing force can be adjusted. The housing 1 need not necessarily be more convex on the upper surface thereof than on the lower surface thereof. The housing 1 may therefore be spherical or otherwise symmetrical, since even a symmetrical housing may provide lift by controlling the circulation.

The fan blades may also be self-steering, in which case the blade angle is automatically directed to the correct position in different operational stages, when for instance a change in the manoeuvring speed is achieved using the guide vanes. The operation of the self-steering fan blades is based on the angles of the mounting shaft and on the location on the blade so that the flow turns the angle of the upper fan blades in a negative direction in front of the aircraft while the speed increases and the angle of the lower fan blades in the negative direction at the rear of the aircraft in a similar situation. When the blade angles are arranged to be self-steering, the aircraft can be steered for instance by changing the centre of gravity or by turning the guide vanes.

The air spoilers may also be provided with openings. In addition, one or even both edges of an annular air spoiler may be toothed.

The aircraft may also function as a dwelling and for example solar or wind energy or for instance fuel cells can be used as energy therein. The aircraft may utilize wind energy for instance in such a manner that the aircraft has landed on the ground and remains stationary while the blade angle of the fan blades is arranged such that the wind rotates at least the upper rotating ring. Small electric motors should preferably be used as the power source. Furthermore, linear motor type of rotating and bearing solutions as well as magnetic bearing can further be used. The blade angles can also be controlled by a small electric motor connected to a fastening point on each blade or by a corresponding electromagnetic actuator. This electromagnetic actuator may also operate regeneratively, in other words so that changes in blade angles caused by turbulence allow the actuator to produce electric energy.

The invention claimed is:

1. A method of steering an aircraft comprising a housing and fan means, the method comprising forming a circulation using the fan means, directing the circulation along the housing and steering the aircraft by controlling the circulation and a stagnation point associated with the circulation.

2. A method as claimed in claim 1, wherein during take off the stagnation point is directed below the housing in order to achieve lift.

3. A method as claimed in claim 2, wherein the stagnation point is directed from the front end of the housing below the housing in order to achieve thrust.

4. A method as claimed in claim 1, wherein the stagnation point is directed to the rear end of the housing in order to achieve thrust.

5. A method as claimed in claim 4, wherein the stagnation point is transferred from the front end of the housing to the rear end of the housing in order to achieve suction power in the front end of the housing and thrust at the rear end of the housing.

6. A method as claimed in claim 1, wherein the stagnation point is directed from the front end of the housing below the rear end of the housing by directing the flow above the housing through the tail of the housing below the rear end of the housing in order to generate suction power in front of the housing and in order to achieve lift below the rear end of the housing.

7. A method as claimed in claim 1, wherein air spoilers are utilized for directing the circulation.

8. A method as claimed in claim 1, wherein the circulation is achieved by means of fan blades rotating about the housing.

9. A method as claimed in claim 1, wherein the circulation is achieved by means of propeller fans.

10. A method as claimed in claim 1, wherein the housing produces lift during the level flight of the aircraft.

11. An aircraft comprising a housing and fan means, wherein the fan means are such that they provide adjusting the blow direction and blowing force of the airflow so that air circulation is achieved and directed along the housing and the fan means are arranged to direct the circulation and to control the position of a stagnation point associated with the circulation.

12. An aircraft as claimed in claim 11, wherein air spoilers are provided at the fan means, whereby the circulation is directed and the position of the stagnation point is controlled by the fan means and the air spoilers.

13. An aircraft as claimed in claim 12, wherein at least one of the air spoilers is annular.

14. An aircraft as claimed in claim 12, wherein the air spoilers are arranged to correspond to the form of the streamline or they are at a positive angle of attack in relation to the streamlines so as to produce lift.

15. An aircraft as claimed in claim 11, wherein fan blades rotating about the housing form the fan means.

16. An aircraft as claimed in claim 15, wherein the fan blades are arranged horizontally.

17. An aircraft as claimed in claim 15, wherein the fan blades are narrower at the root and at the tip than at the middle part thereof.

18. An aircraft as claimed in claim 15, wherein the fan blades are broader at the root than at the tip.

19. An aircraft as claimed in claim 15, wherein electromagnetic actuators are connected to the mounting shafts of the fan blades to control the blade angle.

20. An aircraft as claimed in claim 19, wherein the electromagnetic actuator is configured to operate regeneratively so that changes in blade angles caused for instance by turbulence allow the actuator to produce electric energy.

21. An aircraft as claimed in claim 11, wherein propeller fans form the fan means.

22. An aircraft as claimed in claim 21, wherein the propeller fans are channel fans, whereby a protective ring functioning as an air spoiler is placed around the propeller.

23. An aircraft as claimed in claim 11, wherein the upper part of the housing is more convex than the lower part thereof, the housing thus producing lift during level flight.

24. An aircraft as claimed in claim 11, wherein the upper surface of the housing at the rear end of the aircraft is provided with suction slots to direct the circulation through a space between an outer casing and an intermediate casing of the housing.

25. An aircraft as claimed in claim 11, wherein a return air space is formed at the rear end of the aircraft and the return air space is provided with adjustable flaps to direct the circulation through the return air space, whereby air can either be sucked or blown through the flaps.

* * * * *